United States Patent Office 3,441,527
Patented Apr. 29, 1969

3,441,527
PHENOLIC AGENT-ACID CATALYST MODIFIED LIGNOCELLULOSE DERIVATIVE AND PROCESS
Ronald L. Broadhead, Addison, and William R. Dunlop, Maywood, Ill., assignors to The Richardson Company, Melrose Park, Ill., a corporation of Ohio
No Drawing. Filed Nov. 2, 1964, Ser. No. 408,351
Int. Cl. C08g 5/18, 37/16, 37/18
U.S. Cl. 260—17.2                                          11 Claims

ABSTRACT OF THE DISCLOSURE

A mixture of lignocellulose, a phenolic agent, and an acid catalyst soluble in said phenolic agent are subjected to the action of steam in a closed reaction chamber to produce a product having a high curable resin content.

---

The present invention relates to a method of making a new, useful product having a high resinous content from lignocellulose raw materials.

Considerable research effort has been directed to developing commercially acceptable products from lignocellulose raw materials, such as wood flour, sawdust, wood chips and the like. In general, these efforts have been concerned with attempts to chemically modify the natural lignins, cellulose or hemicellulose components of the raw material whereby the modified material has improved properties and resin content and, accordingly, is more useful in such applications as molding compositions, synthetic board manufacture, etc.

Various techniques have been developed by the prior art for treating or processing lignocellulose materials to improve their properties and extend their utility. One such technique involves introducing a charge of the raw material into a vessel, together with a large volume of water, subjecting the mass to elevated temperatures and subsequently "exploding" the cooked mass from the vessel under high pressure. Various types of catalysts or modifying agents are frequently used, particularly acids or bases.

Another technique of recent origin involves a substantially dry type of treatment, wherein raw lignocellulose material is subjected to steam at elevated temperatures in a closed vessel in the substantial absence of large quantities of moisture, with or without the addition of catalysts or modifying agents. A number of patents issued to Glab, such as 2,864,715 and 2,872,330, are exemplary of the latter technique.

While many of the prior art processes have resulted in commercial products, they have been unable in many instances to achieve certain additional properties or characteristics frequently desired. In particular, even through the chemically modified lignocellulose materials of the prior art have been improved to some extent in resinous content, it is generally necessary to add additional resin when using such modified materials in molding applications. Further, such additional resin as well as other agents may frequently be required as additives to improve the flow characteristics of the chemically modified product for molding purposes. The addition of such components increases the cost of the product and thus reduces its competitive position with respect to general purpose molding compositions such as wood flour and phenolic resins.

Accordingly, it is one of the principal objects of this invention to provide a new process for making improved products from lignocellulose raw materials.

Another object is to provide a process for making lignocellulose derivatives containing a larger resinous content than has been heretofore attainable.

A further object is the provision of products of the foregoing type having enhanced flow under molding pressures.

The process of the present invention comprises subjecting raw lignocellulose to the action of substantially dry steam in a closed reaction chamber or autoclave in the presence of a phenolic agent and a strong acid catalyst soluble in the phenolic agent. Preferably, the reaction is conducted in two steps wherein the composition is initially subjected to steam for a short period pressure in the reaction chamber released, followed by a second steam treatment as disclosed and claimed in our copending application Ser. No. 408,350 filed Nov. 2, 1964.

In the foregoing application the process results in obtaining chemically modified lignocellulose products having a minimum of about 20 percent curable resin bound into the final product. The present process results in even higher yields of curable and a further reduction in residual lignin content.

Various types of naturally occurring finely divided lignocellulose materials may be used, particularly wood flour, chips, sawdust, or similar wood waste obtained from ponderosa pine, white pine, southern pine, Douglas fir, western red cedar, spruce and other soft woods. Additionally, similar hard wood derivatives may also be used, such as those obtained from birch, oak, maple, ash and the like. In general, the lignocelluose should have a particle size of no more than about 8 mesh with a preferred range of between 50–100 mesh.

The phenolic agent contemplated as a component of the reaction mass may be phenol, a cresol, a xylenol or mixtures thereof and is preferably employed within the range of between about 5–15 percent based on the weight of the lignocellulose charge. If more than about 15 percent of the phenolic agent is added, the final product is usually found to contain additional undesired volatiles, generally unreacted phenolic agent. Accordingly, while phenolic agent may be added above 15 percent, the additional benefits are usually negligible.

As indicated above, the reaction or chemical modification is conducted in the presence of a strong acid which is soluble in the phenolic agent. At the present time, best results have been obtained with alkyl aryl sulfonic acids, such as ortho and p-toluenesulfonic acid. However, other analogous phenol-soluble acids may also be used, exemplified by xylenesulfonic acids, such as 3,4-xylenesulfonic acid and similar alkylated phenyl sulfonic acids. Also, certain halogenated acetic acids are suitable such as di- or trichloroacetic acid. The acids should have a pKa of about −7 to 1.5 as measured in water. Preferably, the acid catalyst is employed within the range of about 0.5 to 1.0 percent by weight of the lignocellulose raw material.

The lignocellulose, phenolic agent and catalyst are initially mixed together and then placed into the reaction chamber. Substantially dry steam at a gauge pressure of about 250–500 p.s.i., and preferably 300–400 p.s.i., is then introduced into the chamber for an initial period of between 1–10 minutes and, preferably, 2–5 minutes when using the aforementioned two-step process. The temperature of the steam at these pressures is between about 400° F. to 470° F. and 415° F. to 445° F., respectively. In a two-step process the pressure is then released to a point where it is below 100 p.s.i. and, preferably, about atmospheric pressure. The charge is then immediately subjected to a second steam treatment for a period of from 1–10 minutes and, preferably, 2–5 minutes wherein the steam is within the same p.s.i. and temperature range as used in the first step.

The foregoing process results in a marked increase in the curable resin content of the lignocellulose as compared to the raw lignocellulose or other chemically modified lignocellulose products such as might be obtained, for example, in a one-step process without using the acid catalyst. In general, it can be expected that the present process, using the phenolic agent and acid catalyst within the ranges indicated, will yield a final chemically modified lignocellulose derivative having a minimum curable resinous content of about 40 percent of the total weight of the initial raw lignocellulose, particularly in the case wherein the raw material is a woody type product and between about 10–15 percent phenolic agent is used with the acid catalyst. Further, the process also results in a maximum residual lignin content of about 12 percent and, more generally, under 3 percent.

The total curable resin present in the lignocellulose is measured by means of solvent extraction using three different solvents in sequence, namely methanol, dioxane and then dimethyl formamide, after initially removing water and toluene soluble components. The water and toluene components comprise, primarily, sugars and fats and natural wood resins, respectively.

As indicated, the reaction is preferably conducted in two steps; however, the use of the particular type of acid catalysts disclosed will permit the reaction to be conducted in one step provided the length of time is about equivalent to the combined period normally employed in the two-step process or between about 4–10 minutes.

The use of a phenolic reagent in combination with an acid catalyst in the manner contemplated herein has been demonstrated to provide markedly improved results with respect to obtaining a larger proportion of curable resin in the modified lignocellulose. When the basic process is further used in combination with the two-step process a synergistic effect appears to be possible in most instances.

As further demonstrating the principles of the present invention, the following data is presented of results obtained when using as an acid catalyst p-toluenesulfonic acid with xylenol as the predominating phenolic agent:

strates the results of a single step cook without using an acid catalyst or a phenolic agent. In this instance some curable resin is obtained, however, a high percentage of original unconverted lignin remains.

Example 3 demonstrates the results obtained when a wood flour and cresol mixture is subjected to a one-step process in the absence of an acid catalyst of the type contemplated. The resulting curable resin obtained comprised 18.7 percent and the residual lignin had dropped to 18.5 percent. These latter percentages are to be compared to the percentage of curable resin and lignin obtained in Examples 4–8 wherein a phenol soluble acid catalyst was used.

Also of interest is the fact that the product obtained by acid catalyzation actually contained somewhat less water soluble components than the product resulting from a steam cook with or without a phenolic agent but in the absence of an acid catalyst. As indicated by the examples, water solubles do not exceed normally a maximum of about 15 percent. This phenomenon is somewhat unexpected in view of the fact that in general hemicelluloses and cellulose are hydrolyzed to water soluble sugars in the presence of steam and acids. Further, it is to be noted that the natural lignin content is substantially reduced and converted to a curable resinous form.

The resinous products obtained from the presently described process are somewhat similar in characteristics to novolak resins. Thus, the products can be cured to a hard infusible product by the addition of a formaldehyde donor such as hexamethylene tetraamine using the customary temperatures and pressures normally employed with phenolic resins, such as from 500 to 5000 p.s.i. and from 200° F.–500° F. Further, the present product can be employed as the resinous binder component of a molding composition, for example, and molded in the usual man-

| Example No. | Reagent | Reaction conditions | | | | Product analysis | | |
|---|---|---|---|---|---|---|---|---|
| | | Wt. percent reagent | Wt. percent acid catalyst | Pressure (p.s.i.) | Cook time (min.) | Percent water solubles | Percent total curable resin | Percent residual lignin ($H_2SO_4$ method) |
| 1 | | | | | | | | 27.8 |
| 2 | | | | 320 | 6 | 15.3 | 16.1 | 23.5 |
| 3 | Xylenol | 11.1 | | 320 | 4 | 16.5 | 18.7 | 18.5 |
| 4 | do | 9.05 | 0.68 | 320 | 2 and 2 | 14.2 | 27.9 | 11.8 |
| 5 | do | 9.67 | 0.73 | 320 | 8 | 14.1 | 33.4 | 3.98 |
| 6 | do | 9.82 | 0.73 | 320 | 2 and 6 | 13.1 | 33.5 | 4.11 |
| 7 | do | 15.9 | 0.80 | 320 | 8 | 13.6 | 41.9 | 2.68 |
| 8 | do | 14.7 | 0.74 | 320 | 2 and 6 | 14.9 | ¹44.8 | 2.64 |

¹ Total resin to be expected from reaction of 15% xylenol with 28% lignin =43%.

In the foregoing examples the wood flour used was 80 mesh ponderosa pine and the xylenol was Cresylic Acid No. 5 (Pitt-Consol) comprising, primarily, by weight 3,5 xylenols _____ 45–50
3,4 xylenols _____ 20–25
Ethyl phenols _____ 20–25

The product of Examples 5 and 7, as indicated, was obtained by a one-step process wherein the mixture was subjected to steam in a closed chamber for the periods shown. All other products, with the exception of Examples 1 and 2, were prepared by a two-step process wherein steam was initially introduced into the closed chamber containing the mixture for the preliminary two-minute period, followed by a reduction of pressure to below 100 p.s.i., followed by subjecting the mass in the chamber to a second steam treatment at the same pressure for the periods specified. The product resulting from the process is usually dark brown and in powdery form. Bulk densities are usually between about 0.8 to 1.5, depending on the particular process conditions and the starting material.

As shown by the data, the untreated wood flour contained no curable resin as determined by the extraction method described hereinabove, although it did not contain 27.8 percent by weight residual lignin as determined by the sulfuric acid extraction test. Example 2 demonner. In particular, these new resinous, chemically modified lignocellulose products mixed with curing agents such as hexa, when combined with fillers such as wood chips or sawdust, within the range of about 3–95 percent of resinous product, can be used to form particle boards or molded products using heat and pressure without the necessity of adding additional resin. However, for particular applications or to increase flow in a mold resins may be added as desired.

What is claimed is:

1. A method of improving the curable resinous content of a lignocellulose material which comprises subjecting to the action of steam at a temperature above about 400° F. and for a period of about 4–10 minutes in a closed chamber a mixture of lignocellulose, from about 5–15 percent based on the weight of the lignocellulose of a phenolic agent from the class consisting of phenol, cresols, and xylenols, and between about 0.5 to 1.0 percent based on the weight of the lignocellulose of an acid catalyst soluble in said phenolic agent, said acid catalyst having a pKa of about −7 to 1.5 when measured in water.

2. A method as described in claim 1 wherein the phenolic agent is a cresol.

3. A method as described in claim 1 wherein the acid catalyst is selected from the class consisting of ortho and para-toluenesulfonic acid.

4. A method of improving the curable resin content of a lignocellulose material which comprises initially subjecting in a closed chamber a mixture of lignocellulose, from 5 to 15 percent based on the weight of the lignocellulose of a phenolic agent from the class consisting of phenol, cresols and xylenols and between about 0.5 to 1.0 percent based on the weight of the lignocellulose of an acid catalyst soluble in said phenolic agent, said acid catalyst having a pKa of about −7 to 1.5 when measured in water, to the action of steam at a temperature of between about 400° F. to 470° F. for a period of from about 1.5 to 5 minutes, suspending the steam application and permitting the pressure within said chamber to fall below 100 p.s.i. and again subjecting the mass to the action of steam within the same range of conditions as employed in said initial steam treatment.

5. A method as described in claim 4 wherein said lignocellulose is a woody derivative having a maximum particle size of 8 mesh.

6. A method as described in claim 4 wherein the temperature of said steam is within the range of about 415° F. to 445° F.

7. A method as described in claim 6 wherein said phenolic agent comprises predominantly cresols and said acid catalyst is a member of the class consisting of ortho and para toluene sulfonic acid.

8. A method as described in claim 6 wherein said phenolic agent comprises predominantly xylenols and said acid catalyst is a member of the class consisting of ortho and para toluene sulfonic acid.

9. A chemically modified lignocellulose product derived from the method of claim 4 wherein said product has a density within the range of 0.8 to 1.5 and a minimum of about forty percent of an integral curable resin.

10. A chemically modified lignocellulose product as described in claim 9 having a maximum residual lignin content of about twelve percent.

11. A molded article formed by molding under heat and pressure a composition containing a product as described in claim 9.

References Cited

UNITED STATES PATENTS

| | | | |
|---|---|---|---|
| 1,923,756 | 8/1933 | Sherrard et al. | 260—17.2 |
| 2,319,951 | 5/1943 | Schorger | 260—17.2 |
| 2,501,665 | 3/1950 | Evans et al. | 260—17.5 |
| 3,033,695 | 3/1966 | Glab | 106—163 |

OTHER REFERENCES

Chem. Abstract 51 8429e, Migita et al.
Chem. Abstract 55 13895f, Imoto et al.

WILLIAM H. SHORT, *Primary Examiner.*

E. M. WOODBERRY, *Assistant Examiner.*

U.S. Cl. X.R.

106—163